(12) United States Patent
Kashdan

(10) Patent No.: US 8,505,513 B2
(45) Date of Patent: Aug. 13, 2013

(54) FUEL INJECTION METHOD FOR A DIRECT-INJECTION AUTO-IGNITION INTERNAL-COMBUSTION ENGINE

(75) Inventor: Julian Kashdan, Colombes (FR)

(73) Assignee: IFP, Rueil Malmaison Cedex (FR)

( * ) Notice: Subject to any disclaimer, the term of this patent is extended or adjusted under 35 U.S.C. 154(b) by 513 days.

(21) Appl. No.: 12/793,067

(22) Filed: Jun. 3, 2010

(65) Prior Publication Data
US 2010/0307450 A1      Dec. 9, 2010

(30) Foreign Application Priority Data
Jun. 3, 2009   (FR) .................................. 09 02660

(51) Int. Cl.
*F02B 75/08*    (2006.01)
*F02D 41/30*    (2006.01)

(52) U.S. Cl.
USPC ........... 123/270; 123/298; 123/299; 123/472; 123/668

(58) Field of Classification Search
USPC ................ 123/270–272, 276, 280, 298, 299, 123/300, 305, 668, 670
See application file for complete search history.

(56) References Cited

U.S. PATENT DOCUMENTS

| | | | | |
|---|---|---|---|---|
| 3,358,349 | A * | 12/1967 | Rosen | 29/888.048 |
| 7,263,985 | B2 * | 9/2007 | Kaneko | 123/670 |
| 8,051,829 | B2 * | 11/2011 | Kurtz et al. | 123/305 |
| 8,267,065 | B2 * | 9/2012 | Kurtz et al. | 123/305 |
| 2012/0234285 | A1 * | 9/2012 | Venugopal et al. | 123/193.6 |
| 2012/0323468 | A1 * | 12/2012 | Miyaura et al. | 701/105 |

FOREIGN PATENT DOCUMENTS

| CN | 1434193 A | 8/2003 |
|---|---|---|
| JP | 2010-281322 | * 12/2010 |

* cited by examiner

*Primary Examiner* — Hai Huynh
(74) *Attorney, Agent, or Firm* — Antonelli, Terry, Stout & Kraus, LLP.

(57) ABSTRACT

The present invention is a fuel injection method for a direct-injection internal-combustion engine, preferably of diesel type, comprising a cylinder (10) closed by a cylinder head (16), a piston (12) comprising a bowl (18), and a fuel injector (48). The method feeds the fuel into a bowl coated with a thermal insulation coating in at least two successive injections in quick succession to achieve low-temperature combustion of the fuel mixture.

20 Claims, 1 Drawing Sheet

FUEL INJECTION METHOD FOR A DIRECT-INJECTION AUTO-IGNITION INTERNAL-COMBUSTION ENGINE

BACKGROUND OF THE INVENTION

1. Field of the Invention

The present invention relates to a fuel injection method for a direct-injection auto-ignition internal-combustion engine preferably of diesel type. More particularly the invention preferably relates to diesel type engines operated in a low-temperature combustion mode of the fuel mixture, more commonly known as LTC (Low-Temperature Combustion).

2. Description of the Prior Art

This LTC combustion type notably affords the advantage of limiting the production of pollutants due to combustion and in particular of limiting the production of nitrogen oxides (NOx) and of particles.

This combustion is generally carried out using a large amount of exhaust gas recirculated (EGR) to the engine intake to lower the combustion temperatures, allowing reduction of NOx emissions. Use of a high proportion of pre-mix air and fuel provides a relatively homogeneous mixture before the combustion, which limits the production of particles to be limited.

However, this combustion type has the major drawback of producing high HC emission levels that are discharged to the engine exhaust. This HC production is essentially linked with the low combustion temperatures that do not allow total oxidation of the HC to CO, then to $CO_2$.

Patent application CN-1,434,193 describes an engine with a cylinder within which a piston carrying a hollow bowl slides in a reciprocating rectilinear motion. A combustion chamber intended for a fuel mixture is thus defined by the cylinder wall, the face of the cylinder head opposite the piston, the upper face of the piston and the walls of the bowl.

As explained in detail in the aforementioned document, the thermal losses (heat losses generated upon combustion of this fuel mixture) through the walls of the combustion chamber of the engine are to be minimized. The surfaces of the bowl are therefore coated at least partly with a thermal insulation coating, of ceramic type for example having a very low thermal conductivity.

This coating thus limits the heat loss generated upon combustion of the fuel mixture, which allows maintaining high combustion temperatures. These high temperature levels thus promote better oxidation of the unburnt hydrocarbons (HC) and of the carbon monoxides (CO). Furthermore, using such a coating causes a rise in the temperatures of the combustion chamber walls, which has the effect of limiting the formation of liquid fuel films that form notably at the surface of the piston. In fact, these liquid fuel films are an insignificant source of HC production, in particular in the LTC combustion type.

The temperature increase however leads to drawbacks harmful to the combustion, such as a reduction of the fuel mixture auto-ignition delay and an increase in the combustion velocity. These excessive combustion velocities, which generally lead to high energy release peaks, are bad because they are combined with high combustion noise levels (or engine noise).

The present invention overcomes the aforementioned drawbacks by a fuel injection method that allows the combustion noise levels to be reduced.

SUMMARY OF THE INVENTION

The invention relates to a fuel injection method for a direct-injection internal-combustion engine preferably of the diesel type, comprising a cylinder closed by a cylinder head, a piston comprising a bowl and a fuel injector, wherein the fuel is fed into the bowl coated with a thermal insulation coating in at least two successive injections in close succession to achieve low-temperature combustion of the fuel mixture.

The method can introduce the fuel in successive injections with a delay corresponding to a crankshaft rotation angle ranging between 1° and 10° between the end of an injection and the start of the next injection.

The method can introduce the fuel in successive injections of equal amounts of fuel.

The method can introduce the fuel in successive injections of different amounts of fuel.

The method can introduce the fuel in successive injections of increasing amounts of fuel.

The method can introduce the fuel in successive injections of decreasing amounts of fuel.

The method can introduce the fuel in successive injections of fuel amounts ranging between 5% and 50% of the overall amount of fuel.

BRIEF DESCRIPTION OF THE DRAWINGS

Other features and advantages of the invention will be clear from reading the description hereafter, given by way of non-limitative example, with reference to the accompanying figures wherein.

DETAILED DESCRIPTION OF THE INVENTION

Figure 1:
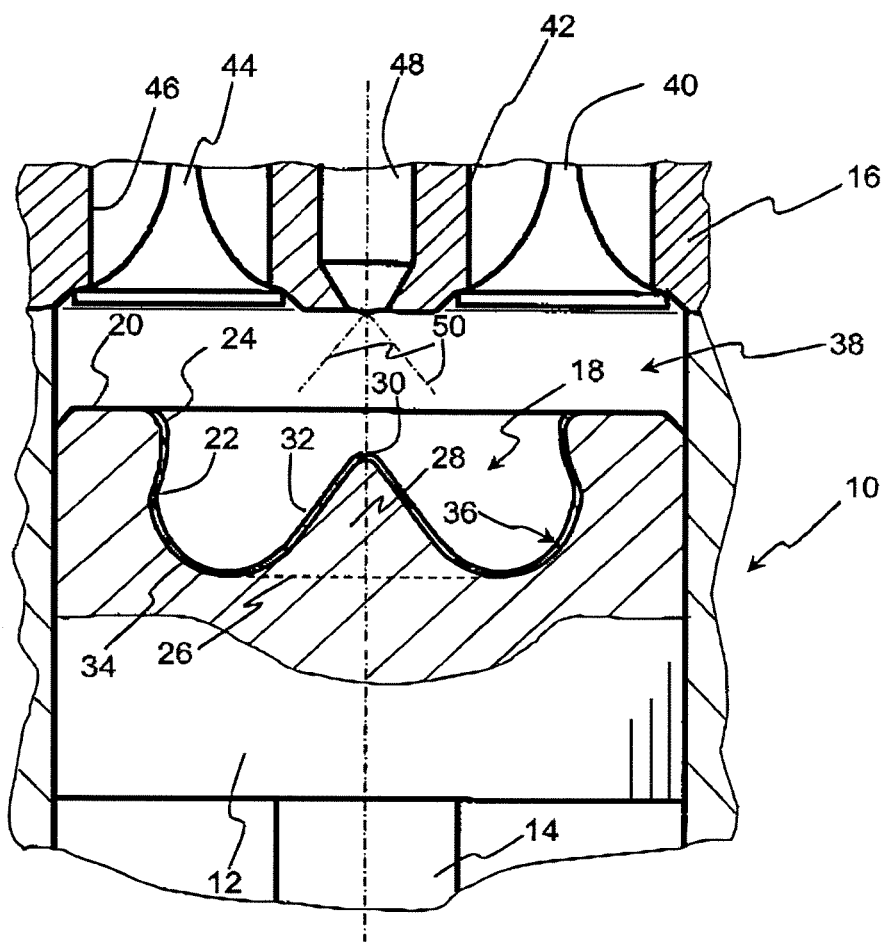
FIG. 1 is a view of a part of an internal-combustion engine using the method according to the invention.

FIG. 1 illustrates, in partial cross-section, an auto-ignition direct-injection internal-combustion engine operated in a low-temperature combustion mode. This engine is preferably of diesel type but this does not rule out in any way other types of engine such as those using gasoline or a gaseous fuel (VNG, LPG, etc.).

This engine comprises at least one cylinder 10 within which a piston 12 slides in a reciprocating translative motion under the effect of a connecting rod 14 linked to a crankshaft (not shown), and a cylinder head 16 that closes the top of the cylinder.

The top of the piston comprises a concave bowl 18 having an upper face 20 of the piston, a lateral surface 22 linked to face 20 by a shoulder 24 and a bowl bottom 26. Preferably, a projection 28, protruding in the direction of cylinder head 16, is housed in the bowl. This projection, generally of truncated shape, is arranged substantially at the center of the bowl. The rounded top 30 of this projection is extended, in the direction of bowl bottom 26, by a substantially rectilinear inclined flank 32, then by a curvilinear part 34 that connects flank 32 to bowl bottom 26 and to lateral surface 22.

The various walls of this bowl are coated with a thermal insulation coating 36 which minimizes thermal losses through these walls.

Advantageously, this coating is of ceramic type and notably of the group of silicon nitrides. The rest of the description therefore mentions, only by way of example, a ceramic coating for the bowl.

Thus, a combustion chamber 38 is formed in this cylinder defined by the portion of cylinder head 16 opposite piston 12, the internal peripheral surface of cylinder 10, upper face 20 of piston 10 and the bowl walls coated with ceramic coating 36.

Cylinder head 16 carries at least one intake having an intake valve 40 and an intake pipe 42, and at least one exhaust with an exhaust valve 44 and an exhaust pipe 46.

Fuel injection is arranged in cylinder head 16 to feed fuel into combustion chamber 38. The fuel injection includes a fuel injector 48, preferably a multijet injector, which comprises, in a vicinity of the nozzle thereof, a muliplicity of orifices through which the fuel is sprayed into the combustion chamber in form of jets 50.

Advantageously, the axis of the injector is coaxial to the axis of the projection so that the fuel jets are fed into the bowl. Thus, the bowl, the projection and the injector are arranged coaxially in relation to one another.

Figure 2:
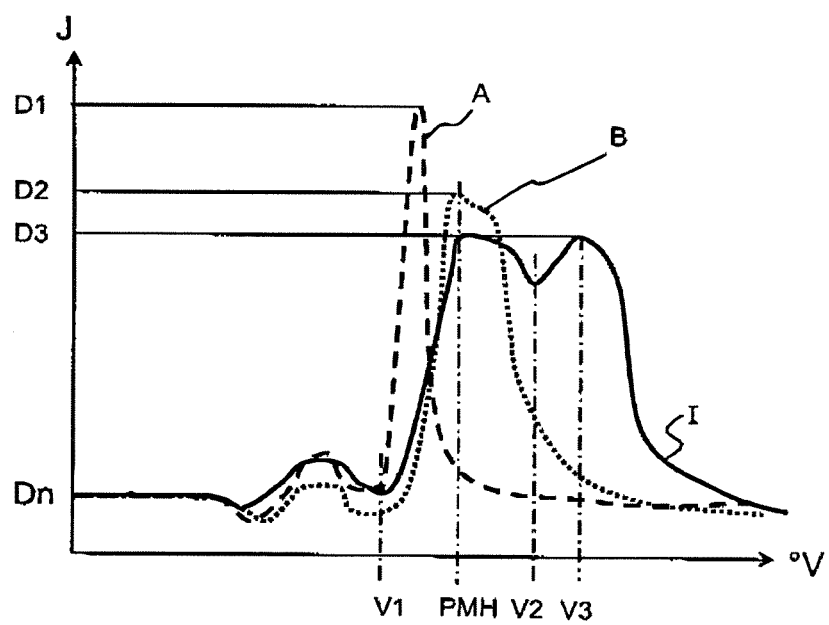
FIG. 2 shows curves illustrating the energy release (J) as a function of the crank angle (° V) for engines of the prior art and for an engine using the method according to the invention.

FIG. 2 shows curves illustrating the energy release (J) as a function of the crank angle (° V) for an engine of the prior art (A), in dashed line, without multiple fuel injection, and comprising a piston with a bowl coated with a ceramic coating, for another engine of the prior art (B), in dotted line, without multiple fuel injection and comprising a piston with a bowl without ceramic coating, and for an engine using the method according to the invention (I), in thick line.

Thus, for the engine of the prior art with the energy release of curve A, fuel is fed, in a single main injection, into the combustion chamber through injector 48 at a crank angle V1 close to the compression Top Dead Center of this engine (PMH in the figure) and before TDC. More particularly, this fuel is fed into bowl 18 coated with a ceramic coating in order to mix with the fluids (air and EGR) contained therein. This fuel forms a fuel mixture that is ready to auto-ignite under the effect of the compression by the piston. This combustion allows generation of an energy release that is suddenly increased by energy release Dn resulting from the engine compression phase, so as to reach a maximum release D1 before the TDC of the engine.

As already mentioned above, such a high energy release notably leads to the generation of high combustion noise levels in the combustion chamber. In fact, using a bowl coated with a ceramic coating increases the combustion velocity of the fuel mixture, thus leading to an increase in the energy release and in the noise levels.

Regarding the energy release of the engine of the prior art of curve B, the fuel is fed, as described above, into ceramic coating-free bowl 18 to achieve the fuel mixture. Upon auto-ignition of this fuel mixture, the energy release increases from point Dn and reaches a maximum release D2 in the vicinity of the TDC of the engine that is lower than the maximum release of curve A.

This energy release causes production of lower combustion noise levels than in the case of curve A, but it generates high HC emissions.

In order to overcome this problem, the use of multiple injection strategies in close succession according to the invention allows adjustment of the energy release in order to limit the combustion noise to acceptable levels.

Furthermore, combining a combustion chamber including a bowl with a ceramic coating and multiple injection strategies in close succession also improves the HC/CO/noise compromise for engines operated according to the LTC diesel combustion mode.

More precisely, an injection strategy with at least two successive fuel injections in close succession from crank angle V1 is provided for the engine using the method according to the invention (curve I).

Curve I of FIG. 2 illustrates the method according to the invention with the energy releases corresponding to the overall amount of fuel that is divided into two successive fuel injections equivalent to the overall amount of fuel of the engines according to the prior art. A first amount of fuel is injected at crank angle V1, then a second amount of this fuel is injected at crank angle V2 at a very short interval from the initial fuel injection, preferably within a delay corresponding to a crank angle ranging between 1° and 10° between the end of the previous injection and the start of this second injection. The fuel may be introduced in the successive injections in equal amounts of fuel, in successive injections of differing amounts of fuel wherein the successive injections are either increasing amounts of fuel or decreasing amounts of fuel and finally, the successive injections of fuel amounts may be between 5% and 50% of the overall amount of fuel.

Thus, the first fuel injection provides, at the TDC, a fuel mixture combustion with an energy release D2 lower than energy release D1 of the engine of the prior art (energy release reduction of the order of one third). This energy release D2 decreases down to crank angle V2 where the second amount of fuel is injected into the combustion chamber. This second amount of fuel, which is here substantially identical to the first one, provides, at crank angle V3, a fuel mixture combustion with an energy release that is comparable to that of the fuel mixture combustion of the first injection.

It is also possible to carry out a multiplicity of fuel injections greater than two injections.

In this case, the total amount of fuel to be injected can be obtained with successive fuel injections in quick succession using substantially identical amounts of fuel until the desired injection of the total amount of fuel equivalent to the engine of the prior art is obtained.

These amounts of fuel to be successively injected can also be different from one another, such as increasing or decreasing amounts, until the overall amount of fuel to be injected into the combustion chamber is obtained.

Advantageously, in the case of decreasing amounts, these amounts can range between 5% and 40% of the amount of fuel of the previous injection.

By way of example, it is possible to consider injecting, for three successive injections, 50% of the overall amount during a first injection at angle V1 before the TDC, then 30% of this overall amount after a 5° crank angle at angle V2 and, during the third injection, injecting the remaining amount of fuel (i.e. 20% of the overall amount) after a 5° crank angle following the second injection and before the BDC.

These successive injections can be evenly distributed between angle V1 and the BDC, and their number can be different before and after the TDC.

These multiple fuel injections in quick succession permit adjustment of the energy release peaks and therefore the combustion noises while reducing the HC emissions and producing a small amount of NOx, notably for the engine operating points with the lowest loads.

The present invention is not limited to the example described and it encompasses any variant and equivalent covered by the present invention.

The invention claimed is:

1. A method of direct fuel injection for an internal-combustion engine, including a cylinder closed by a cylinder head, a piston comprising a bowl having a thermal insulation coating and a fuel injector, the method comprising feeding fuel into the bowl in at least two successive injections to create a combustible fuel mixture with a delay between successive injections corresponding to a crankshaft rotation angle ranging between 1° and 10° measured between an end of an injection and a start of a next injection.

2. A fuel injection method as claimed in claim 1, comprising:
an amount of fuel in successive injections is in equal amounts.

3. A fuel injection method in accordance with claim 2, wherein:
the engine is an auto-ignition engine.

4. A fuel injection method in accordance with claim 2, wherein:
the engine is a diesel engine.

5. A fuel injection method as claimed in claim 1, comprising:
an amount of fuel in successive injections is in different amounts.

6. A fuel injection method as claimed in claim 5, comprising:
an amount of fuel in successive injections is in increasing amounts.

7. A fuel injection method as claimed in claim 6, comprising:
an amount of fuel in successive injections of fuel amounts is between 5% and 50% of an overall amount of fuel.

8. A fuel injection method in accordance with claim 6, wherein:
the engine is an auto-ignition engine.

9. A fuel injection method in accordance with claim 6, wherein:
the engine is a diesel engine.

10. A fuel injection method as claimed in claim 5, comprising:
an amount of fuel in successive injections is in decreasing amounts.

11. A fuel injection method in accordance with claim 10, wherein:
the engine is an auto-ignition engine.

12. A fuel injection method in accordance with claim 10, wherein:
the engine is a diesel engine.

13. A fuel injection method as claimed in claim 5, comprising:
an amount of fuel in successive injections is between 5% and 50% of an overall amount of fuel.

14. A fuel injection method in accordance with claim 5, wherein:
the engine is an auto-ignition engine.

15. A fuel injection method in accordance with claim 5, wherein:
the engine is a diesel engine.

16. A fuel injection method as claimed in claim 1, comprising:
an amount of fuel in successive injections is between 5% and 50% of an overall amount of fuel.

17. A fuel injection method in accordance with claim 16, wherein:
the engine is an auto-ignition engine.

18. A fuel injection method in accordance with claim 16, wherein:
the engine is a diesel engine.

19. A fuel injection method in accordance with claim 1, wherein:
the engine is an auto-ignition engine.

20. A fuel injection method in accordance with claim 1, wherein:
the engine is a diesel engine.

* * * * *